United States Patent

[11] 3,623,072

| [72] | Inventors | Richard A. Pohlman<br>Cincinnati;<br>Melvin C. Groth, Maineville; Robert M. Ondercin, Cincinnati; Thomas J. Doran, Cincinnati, all of Ohio |
|---|---|---|
| [21] | Appl. No. | 819,569 |
| [22] | Filed | Apr. 28, 1969 |
| [45] | Patented | Nov. 23, 1971 |
| [73] | Assignee | Cincinnati Milacron Inc.<br>Cincinnati, Ohio |

[54] DIGITAL MEASURING SYSTEM
3 Claims, 6 Drawing Figs.

[52] U.S. Cl............................................340/347 AD, 324/83
[51] Int. Cl..........................................H03k 13/02
[50] Field of Search............................ 340/347, 170; 318/20; 328/155; 339/126; 235/154, 151.11; 324/83

[56] References Cited
UNITED STATES PATENTS

| 3,323,053 | 5/1967 | Southern................ | 324/83 |
| 3,163,823 | 12/1964 | Kellis et al................ | 328/155 X |
| 3,312,903 | 4/1967 | Webb........................ | 328/155 X |
| 3,358,280 | 12/1967 | Dougherty, Jr............. | 340/347 |

Primary Examiner—Maynard R. Wilbur
Assistant Examiner—Charles D. Miller
Attorneys—Howard T. Keiser and Jack J. Earl ABSTRACT: A digital-measuring system to indicate the absolute position of movable members on a machine with respect to a predetermined origin. The system is independent from the driving mechanism of the members and is operable using a single linear or rotary analogue transducer per member. The analogue transducer is excited by a constant frequency signal source. Driving of a member causes the output of a transducer to shift in phase with respect to an initial state of a phase counter. This shift in phase is detected and used to update the phase counter and an accumulator containing the absolute position.

INVENTORS
RICHARD A. POHLMAN
MELVIN C. GROTH
ROBERT M. ONDEREIN
THOMAS J. DORAN

DIGITAL MEASURING SYSTEM

BACKGROUND

The device is applicable to machines not requiring a full proportional servo drive system. In other words, positional accuracy is most important. Generally, a measuring system is an integral part of the machine control. Independent measuring systems are available, but their expense make application practical only in special situations. Second, these devices are totally analogue in nature and interface with digital systems is difficult. Totally digital systems are possible; but the use of rotary digital encoders is required. There are several disadvantages to this approach. First, their cost is high; second, they must be coupled to a rotary-driving device. Third, inherent frequency variations and limited pulse resolutions add to the system's inaccuracies. Fourth, the output pulses must be transmitted over significant line lengths. This increases the possibility of noise and consequential spurious triggering of the logic circuits.

The present system is a combination of the best features of the analogue and digital systems. An analogue transducer is used which is relatively low in cost and can be applied to a rotary or linear device. Within the measuring system, there is an immediate analogue to digital conversion and detection is accomplished with digital logic. Hence, an economical, high speed, and accurate system results that is practical for use on manual or automatic control machines.

SUMMARY

The measuring system can be applied to any machine configuration having one or more movable elements. For simplicity, a single element system will be summarized. An analogue transducer is applied to a movable element. A reference counter drives a square to sine converter that has two outputs of equal amplitude but shifted in phase by ninety electrical degrees. These outputs are applied to the analogue transducer resulting in a single sinusoidal output. This signal is converted to a square wave and input to a detection network. A phase counter supplies another input to the detection network. After initialization of the reference counter and the phase counter, the element is moved by an independent external drive. This results in a change of phase of the output of the analogue transducer with respect to the phase counter output. The direction and magnitude of the phase difference is measured in the detection network. A number of output pulses defining the detected difference drives the phase counter in a direction to decrease the difference. The detected difference also updates an accumulator in a direction such that its contents indicate the absolute position with respect to the initialized starting point.

DESCRIPTION OF DRAWINGS

While the invention has been illustrated in some detail according to a preferred embodiment shown in the accompanying drawings, and while the preferred illustrated embodiment will be described in detail, there is no intention to limit the invention to such details. On the contrary, it is intended to cover all modifications, alterations and equivalents falling within the spirit and scope of the appended claims.

DESCRIPTION OF OPERATION

Figure 1:
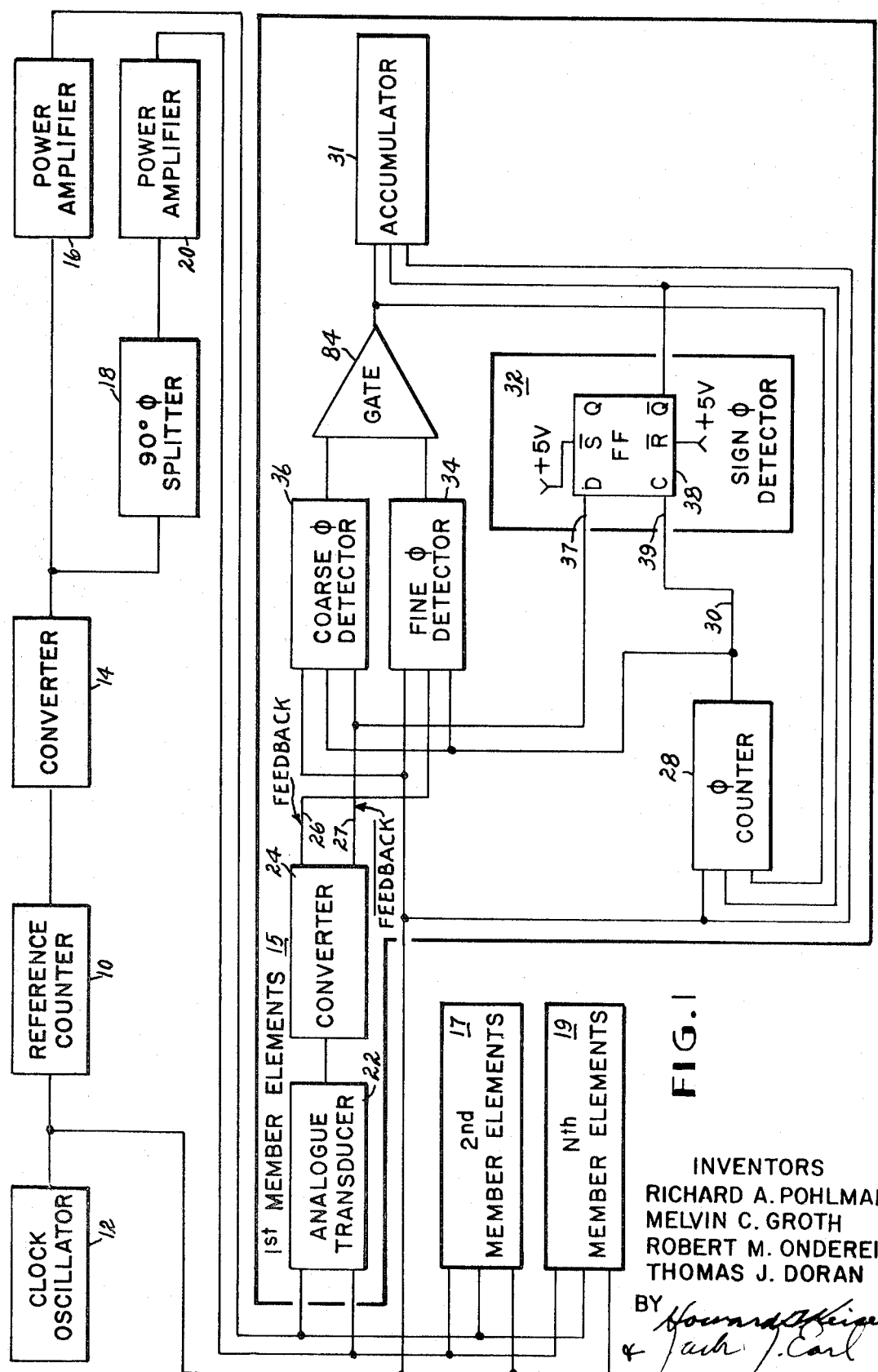
FIG. 1 represents a functional block and line diagram of the entire measuring system.

The measuring system can be applied to any machine configuration having a plurality of movable members that are either manually or automatically controlled. The measuring system input is generated by a combination of elements well-known to those skilled in the art. In FIG. 1 a reference counter 10 driven by a clock oscillator 12 is comprised of a combination of serially connected flip flops. It produces a constant frequency pulse rate which is input to a square to sine converter 14. This circuit is an active five pole Chubev filter with noise and frequency cutoff modifications particular to this application. The converter 14 is coupled to a power amplifier 16 and an adjustable ninety degree phase splitter 18. The phase shifted output is then input to a power amplifier 20. The outputs of the two amplifiers 16 and 20 are given sine and cosine identities. The combination of elements described up to this point is common to all combinations of movable members. The remainder of elements must be implemented on a per member basis. Block 15, defined by the long and short dashed lines, details the elements necessary for a single member. Blocks 17 and 19 indicate that many members may be included in the system. However, for each member added, a set of elements identical to those shown in block 15 is required. Again, for clarity a single member system will be described.

The outputs of the amplifiers 16 and 20 are connected to respective sine and cosine inputs of an analogue transducer 22. The transducer output is routed to a sine to square converter 24. This converter 24 is comprised of an amplifier driven into saturation with a clipper or pulse shaper on its output. In FIG. 1, the square wave output 26 is shifted in time according to movement detected by the transducer. This square wave output is the measuring system input and will be identified as the feedback signal. Another output 27 is the inversion of the output 26 and is designated not feedback.

A control element is needed to follow the instantaneous changes represented by the feedback signal and provide responses consistent with said changes. A phase counter 28 having the clock oscillator 12 as a driving function is used for this purpose. It is comprised of a counting circuit having the same modulus as the reference counter but with add and delete circuits on its input. Triggering of the add or delete circuits causes a respective increase or decrease in the count rate, or a corresponding decrease or increase of the periodicity of an output square wave form. The output square wave form 30 comes from the negation output of the phase counter 28. However, for purposes of this disclosure, it will be identified in the assertion as the command signal.

The object of the measuring system is to detect a phase difference between the feedback signal 26 and the command signal 30 and incrementally change the command signal 30 to correct for the phase difference. The incremental changes are simultaneously counted into an accumulator 31. The algebraic sum of these increments represents the absolute position. In order to appreciate the problems involved, some parameters of a typical system should be recited. The analogue transducers have cyclic outputs. Each output cycle represents an increment of distance parallel to an axis of motion of the element. The magnitude of this increment is determined either in manufacture of the transducer or by coupling of the transducer to the machine. Assume for purposes of explanation, each output period represents 0.200 inches of motion of the element. Also assume the system has a minimum incremental resolution of .0001 inches.

The measuring system uses three phase detectors to completely define the phase difference between the command signal 30 and the feedback signal 26. The sign phase detector 32 determines the sign or direction of the phase difference. The other two detectors 34 and 36 are fine and coarse detectors of the phase difference magnitude. The sign phase detector 32 employs a single flip-flop 38. The not feedback signal 27 and the command signal 30 are connected to the input 37 and clock 39 terminals respectively. On the leading edge of the command signal, the flip-flop input will be high or low depending on the phase relation between the two signals. The flip-flop output is a binary signal indicative of this phase relation and is transmitted to the phase counter 28 and the accumulator 31 to control the update directions.

The system is operable using exclusively the fine phase detector 34 or the coarse phase detector 36, but there are severe limitations. The fine phase detector 34 has an operating frequency of 2.5 kHz. and updates only one increment of .0001 inches per cycle. Therefore, it will lose synchronization with the transducer at a relatively low velocity. The velocity limit may be altered by changing the rate and magnitude of the updating process. However, this increases the amount the system lags the transducer. This is undesirable; and again, the maximum velocity would not be high enough for a wide variety of applications. There are several reasons why exclusive use of the coarse phase detector is difficult and undesirable. First, given a transducer with a .200 inches per period resolution and a driving frequency 2.5 kHz. a phase difference of .0001 inches represents only 200 nanoseconds. Second, the leading edge of the feedback signal is inherently unstable and triggering with this signal edge is difficult. For these reasons, a system using two phase detectors is most desirable.

Figure 2:
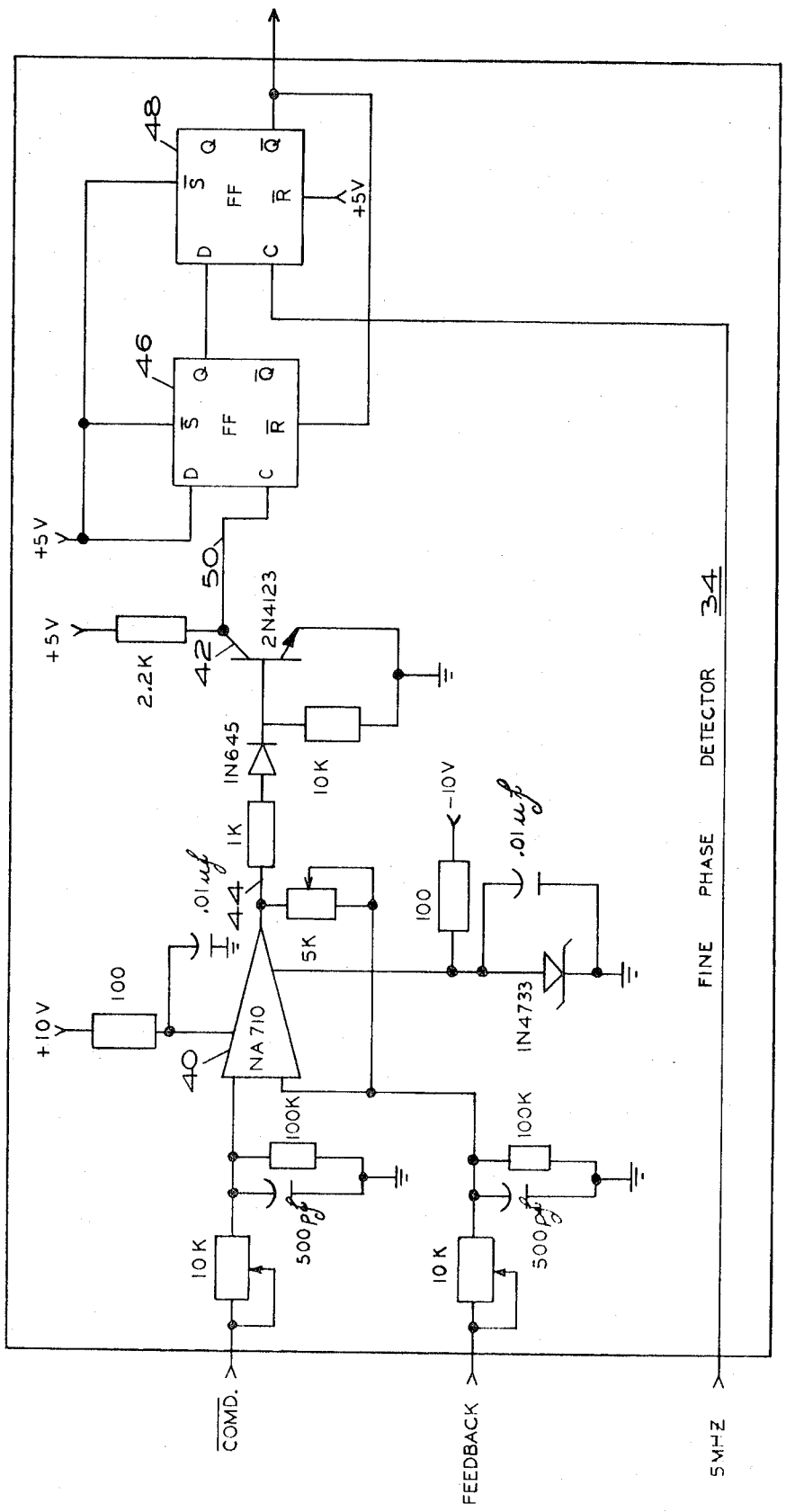
FIG. 2 is a detailed schematic diagram of one of the phase detectors employed in the measuring system.

The fine phase detector 34 shown in FIG. 2 has an input consisting of an operational amplifier 40 connected in a differential amplifier configuration. This supplies a binary output to a switching transistor 42 responsive to its output 44. The amplifier 40 is operable to detect a phase difference between the leading edges of the inputs on each cycle. The command signal 30 and the feedback signal 26 are connected to the inputs of the differential amplifier 40 180° out of phase. If there is no phase difference between the inputs, the amplifier output 44 remains low or at ground; and the transistor 42 remains OFF. A phase difference between the inputs drives the amplifier output 44 high or to some positive signal level. The transistor 42 then switches ON. When the leading edge of the lagging input passes, the amplifier output 44 goes back low or to ground; and the transistor 42 switches OFF. The circuit is sensitive to a small phase difference but is not affected by unstable leading edges of the feedback signal. Also, it does not distinguish the direction of the phase difference but is only sensitive to magnitude. Coupled to the transistor 42 are two flip-flops 46 and 48 in a digital one shot configuration. When transistor 42 turns OFF the transistor output 50 goes high. This positive going edge clocks flip-flop 46 and switches its Q-output high. The next leading edge of the 5 MHZ clock switches the Q̄-output of flip-flop 48 low. This resets the Q-output of flip-flop 46 to a low level. The succeeding clocking edge of the 5 MHZ clock switches the Q̄-output of flip-flop 48 back to a high level. Hence, on each cycle that a phase difference is detected between the inputs, an output pulse is produced from the fine phase detector 34. This represents an increment of motion and is gated to the accumulator 31 and the phase counter 28.

Figure 3:
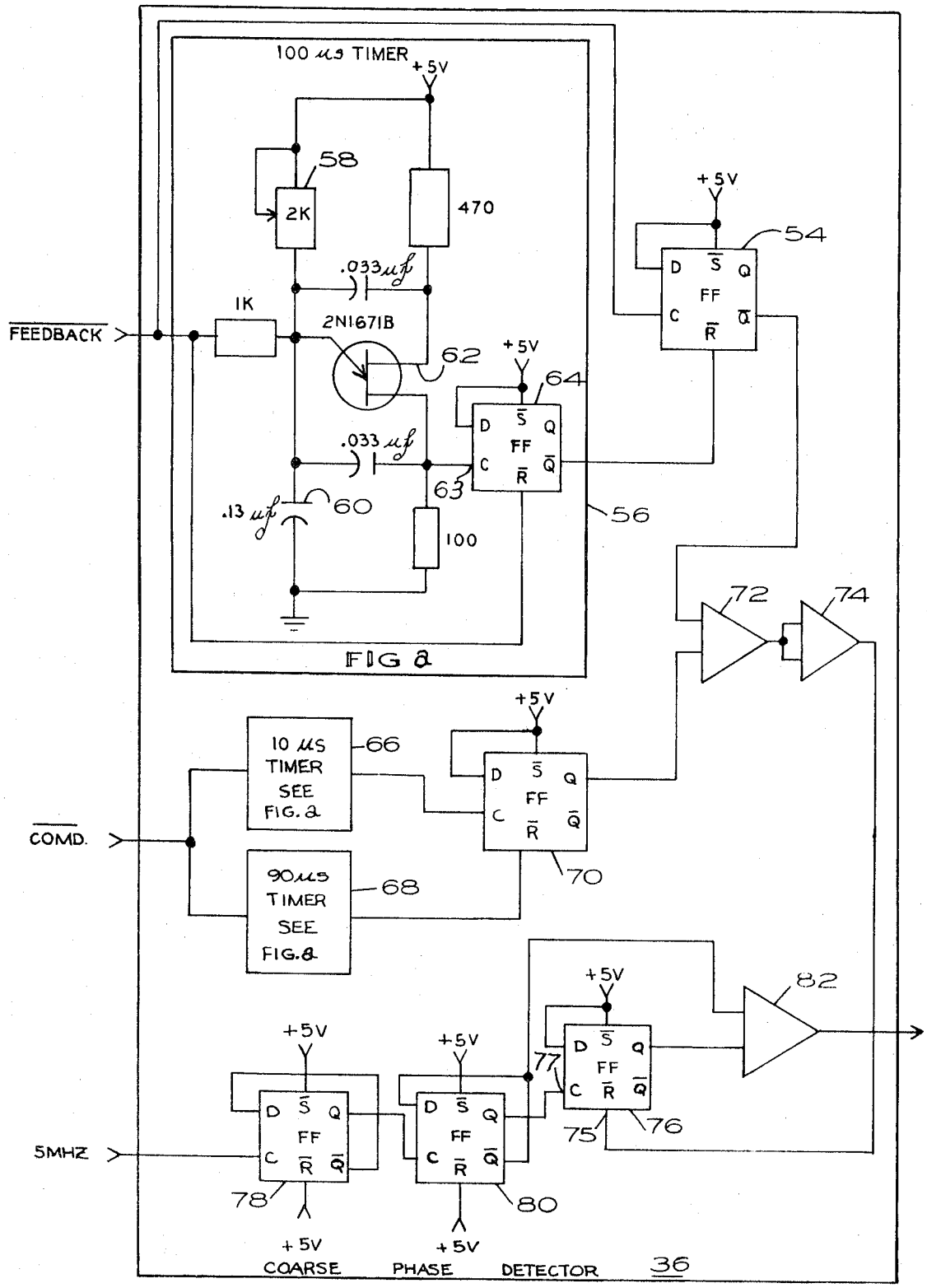
FIG. 3 is a detailed schematic diagram of another of the phase detectors employed in the system.

The coarse phase detector 36, shown in FIG. 3, is a digital circuit that rapidly updates the phase counter 28 and the accumulator 31. The leading edge of the not feedback signal 27 simultaneously triggers a logic flip-flop 54 and 100 microsecond delay 56. The delay 56 has a resistor 58 and a capacitor 60 that determines the time constant. The delay output is switched by a unijunction transistor 62 into the clock input 63 of flip-flop 64. Flip-flop 64 is used to shape up and sharply define the output pulse width. The leading edge of the not feedback signal 27 clocks the Q-output of flip-flop 54 to a low level. After a 100 microseconds, the output of the delay 56 goes low and resets the Q-output of flip-flop 54 to a high level. The leading edge of the command signal simultaneously triggers the 10 microsecond delay 66 and the 90 microsecond delay 68. These delays are similar to the 100 microsecond delay 56 previously described. After 10 microseconds, the output of delay 66 goes high clocking the Q-output of flip-flop 70 to a high level. After 90 microseconds from the leading edge, the output of delay 68 goes low-driving the Q-output of flip-flop 70 back to a low level. If the command and feedback signals are in phase, on each period, flip-flop 54 produces a 100 microsecond window. The output of flip-flop 70 is a smaller pulse width of 80 microseconds equally spaced within the 100 microsecond window. The Q-output of flip-flop 70 and the Q̄-output of flip-flop 54 are connected to a logic NAND gate 72. As long as there is only a very small phase difference, the 80 microsecond pulse will remain within the 100 microsecond window; and the output of gate 72 remains at a high level. There is approximately a 10 microsecond buffer within the window. Hence, given the previously recited parameters, a phase difference representing .005 inches must occur before a window limit is exceeded.

Figure 4A:
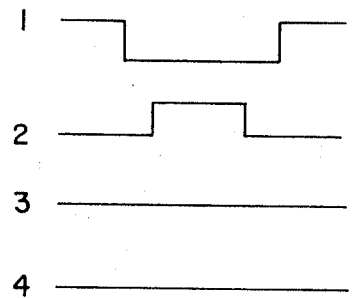
FIG. 4 is a synchrogram to show the time relation between several signals at various points in the measuring system.
Figure 4B:
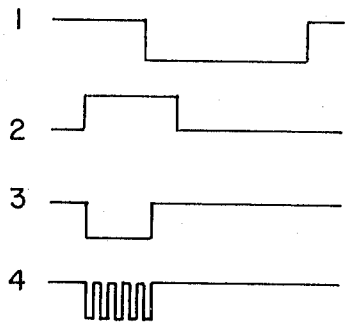
Figure 4C:
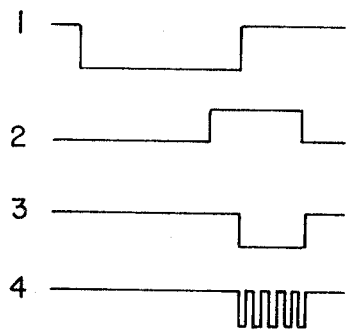

FIG. 4 illustrates the action of the window circuitry. Curve 1 represents the Q̄-output of flip-flop 54. Curve 2 illustrates the Q-output of flip-flop 70. Curve 3 illustrates the output of NAND gate 72, and curve 4 illustrates the output of NAND gate 82 to be described later. FIG. 4a shows an in phase condition, and no output exists on the gate 72. FIG. 4b shows the output gate 72 when the command signal leads the feedback signal. FIG. 4c illustrates the output of gate 72 when the command signal lags the feedback signal. The figures indicate that the coarse phase detector 36 does not distinguish sign but is only responsive to phase difference magnitudes. A phase differential in excess of the amount represented by the buffer causes the output of gate 72 to switch low for a duration proportional to said differential. This output is coupled to a second NAND gate 74 connected as an inverter. The resultant pulse of gate 74 is connected to the reset input 75 of flip-flop 76. Flip-flops 78 and 80 are binary dividers that produce a 1.25 MHZ source of pulses. This source provides an input to the NAND gate 82. A phase differential in excess of the amount represented by the buffer causes the reset input 75 to go high for a time proportional to said phase differential. The next positive going edge on the clock input 77 of flip-flop 76 drives the Q-output high and opens the gate 82. The 1.25 MHZ pulses are allowed to pass. When the reset input 75 goes low, the Q-output goes low and gates off the 1.25 MHZ pulses. Hence, a plurality of pulses is gated into the system that is proportional to the phase differential. Curve 4 in FIG. 4 illustrates the output of gate 82. The output of the coarse phase detector 36 is coupled to an input of gate 84 shown in FIG. 1b. The other input to this gate is the output of the fine phase detector 34. Gate 84 outputs a number of pulses that are routed to the phase counter 28 and the accumulator 31. These pulses drive the accumulator so that it always contains the absolute value of position.

It should be noted at this point that the maximum feedrate the system can follow is dependent on the transducer drive frequency, the output frequency of the binary dividers, and the window size. These three parameters may be adjusted for particular machine applications and transducer resolutions. As previously pointed out, the need for an economic and versatile independent measuring system is accentuated by progress in the machine control art. The use of remote and multiple machine control units has made the digital-measuring system a necessity. The accumulator 31 in the system may take several forms. First, it may be a bidirectional digital counter. This device is comprised of logic flip-flops and associated gating. It has the ability to count up or down depending on input commands. The cumulative states of the flip-flops define a digital magnitude that represents the absolute position of its respective member. Second, the accumulator can be defined by a storage register with an adder/subtracter circuit on its input. A storage register is a group of serially connected storage devices having, in this case, the clock oscillator as a driving function. The contents of the storage register recirculate through the adder/subtracter. The adder/subtracter circuit responds to the outputs from the sign phase detector 32 and the gate 84 to increase or decrease the magnitude in the storage register. The contents of the storage register represent the absolute position of a movable member. Third, the accumulator may be a decimal readout device. There are many types of these devices available. Any one may be used that has inputs responsive to digital signals representing direction and incremental changes in magnitude.

A machining process may require comparison of the input command signal, defining the desired absolute position, with the measured absolute position in the accumulator. This can be accomplished with subtraction logic producing a difference representing error in the positioning device. The error may be visually displayed or operated on by additional facilities. The error may be used to initiate a new machine cycle to correct the present machine position; or it may be incorporated into the succeeding input command signal to eliminate any possible accumulative errors.

What is claimed is:

1. An apparatus for measuring the position of a movable element, said apparatus having a signal source driving an analogue transducer connected to the element and a converter responsive to a periodic output of the transducer for producing a periodic square wave output, the apparatus comprising:
   a. a clock oscillator for producing a constant frequency pulse rate;
   b. a phase counter connected to the clock oscillator and having inputs for selectively increasing and decreasing the periodicity of an output square wave form;
   c. a first phase detector having inputs connected to the converter and the phase counter for providing a binary signal to one of the inputs of the digital counter indicating direction of a phase difference between the inputs;
   d. a second phase detector having inputs connected to the clock oscillator, the converter and the phase counter for producing an output pulse on each period of the inputs in which a phase difference is detected;
   e. a third phase detector having inputs connected to the clock oscillator, the converter and the phase counter for periodically generating a number of pulses proportional to the magnitude of a phase difference between the square wave output and the output square wave form that exceeds a predetermined phase difference magnitude;
   f. a gating network having inputs connected to the second phase detector and the third phase detector and providing an output to the other of the inputs of the phase counter; and
   g. a digital accumulator having inputs connected to the first phase detector and the gating network for producing a digital number word therein representing the position of the movable element.

2. The apparatus of claim 1 wherein said third phase detector further comprises:
   a. means responsive to the square wave output and the output square wave form for providing on each period of the square wave output a resultant pulse having a time duration proportional to the total phase difference between the square wave output and the square wave form minus a predetermined phase difference; and
   b. means responsive to the constant frequency pulse rate and the resultant pulse for generating a number of pulses, said number being proportional to the time duration of the resultant pulse.

3. An apparatus for measuring the position of a plurality of movable members by applying an analogue transducer to each member, each transducer having an input coupled to a signal source and an output connected to a respective converter for generating a square wave output per member, the apparatus comprising:
   a. a clock oscillator for producing a constant frequency pulse rate;
   b. a digital counter for each movable member coupled to the clock oscillator and including inputs for selectively increasing and decreasing the periodicity of an output square wave form;
   c. a plurality of sign phase detectors, each having inputs connected to one of the converters and a corresponding digital counter for providing a binary signal to one of the inputs of the digital counter, said binary signal representing the direction of a shift in phase of one input of the sign phase detector with respect to the other input;
   d. a plurality of fine phase detectors, each responsive to the constant frequency pulse rate and having inputs connected to one of the converters and a corresponding digital counter, and each includes
      (1) means for producing a binary output indicating a shift in phase between the inputs of the fine phase detector, and
      (2) means for producing an output pulse in response to the binary output;
   e. a plurality of coarse phase detectors, each having inputs connected to the clock oscillator, one of the converters and corresponding digital counter and each includes
      (1) means for producing a first output pulse width in response to a square wave output,
      (2) means responsive to the output square wave form for producing a smaller second output pulse width having a time relation with the first pulse width as to be wholly contained therein when there is a predetermined minimum phase difference between the inputs,
      (3) means for comparing the first pulse width and the second pulse width and producing a resultant pulse having a time duration proportional to the time the second pulse width is not contained within the first pulse width, and
      (4) means responsive to the constant frequency pulse rate and the resultant pulse for generating a number of pulses, said number being proportional to the time duration of the resultant pulse;
   f. a plurality of gating networks, each connected to a fine phase detector and corresponding coarse phase detector for producing output signals to the other of the inputs of the digital counter; and
   g. a plurality of digital accumulators, each connected to the clock oscillator, a sign phase detector and a corresponding gating network for producing a digital number therein representing the position of one of the movable members.

* * * * *